March 24, 1931.  J. B. HOLDEN  1,797,774
FISHLINE REEL
Filed Jan. 16, 1928  2 Sheets-Sheet 1
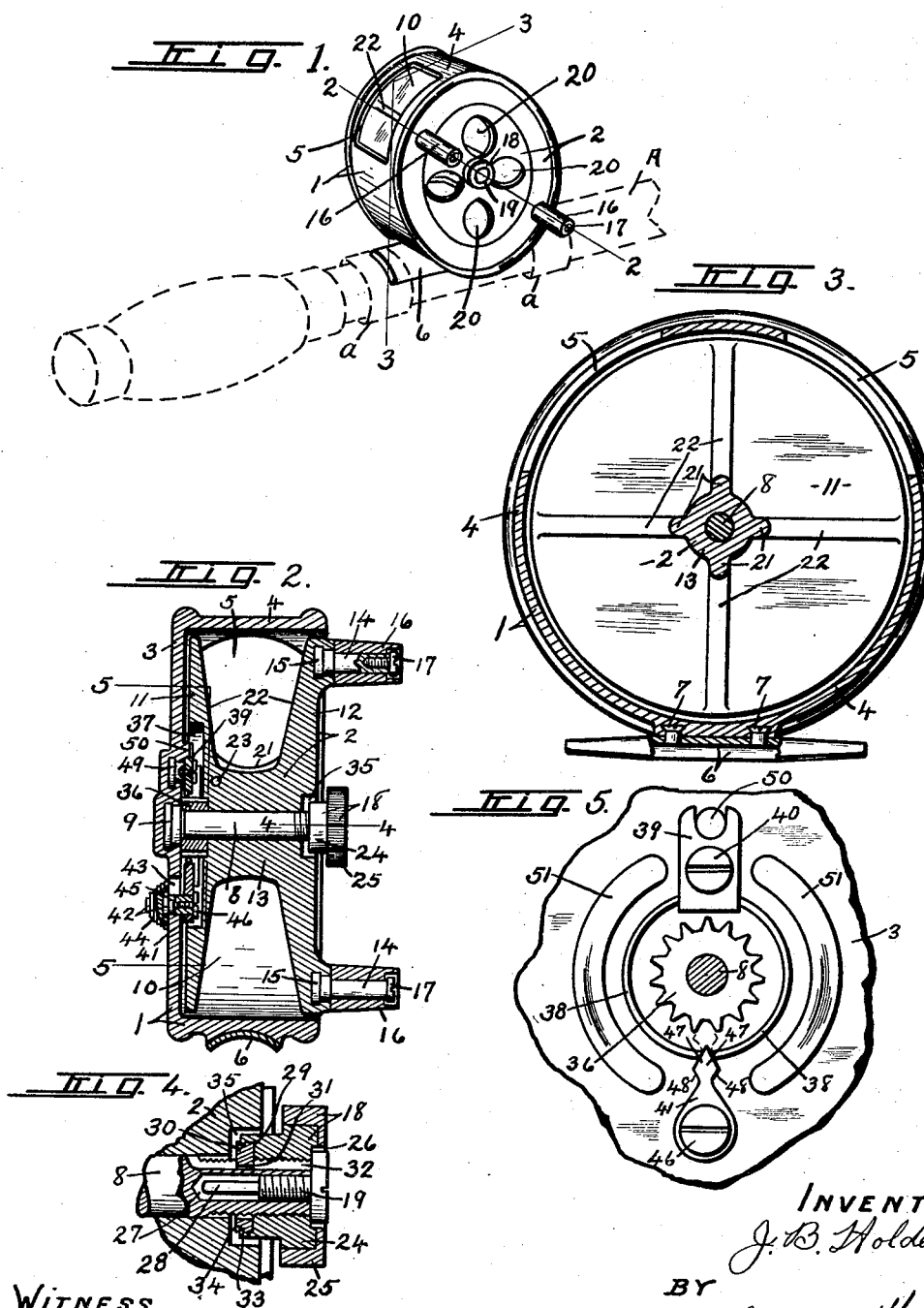
INVENTOR
J. B. Holden
BY
Denison & Thompson
ATTORNEYS
WITNESS
J. J. Mains.

March 24, 1931.   J. B. HOLDEN   1,797,774
FISHLINE REEL
Filed Jan. 16, 1928   2 Sheets-Sheet 2

BAKELITE-11   12 BAKELITE

INVENTOR
J. B. Holden
BY
Denison & Thompson
ATTORNEYS

WITNESS
J. J. Mains

Patented Mar. 24, 1931

1,797,774

UNITED STATES PATENT OFFICE

JOSEPH B. HOLDEN, OF CANASTOTA, NEW YORK, ASSIGNOR TO DIEMOULDING PRODUCTION COMPANY, INCORPORATED, OF CANASTOTA, NEW YORK, A CORPORATION OF NEW YORK

FISHLINE REEL

Application filed January 16, 1928. Serial No. 247,040.

This invention relates to a reel for fishing rods and the like for winding and unwinding a fish line thereon and therefrom, the supporting frame for the spool being provided with suitable means for attachment to a fishing rod.

The device is also equipped with means for permitting a free rotation of the spool and with additional means for retarding its rotation as may be required by the playing out of the line by the fish to keep the line more or less taut and thereby to reduce the liability of fouling of the line upon the fish or other objects, said device being also provided with means operable at will to one position for producing an audible click as the spool is rotated and when moved to another position for preventing such click and thereby allowing the spool to rotate without perceptible noise.

The main object is to produce a light, strong and durable device of this character with a minimum number of parts and still having all of the advantages of the more complicated reels.

Another object is to construct the spool and its supporting frame of non-corrodible material and at the same time to provide those parts with ventilating means for providing the circulation of air around all parts of the line when wound upon the spool and thereby to greatly prolong the life of the line and permit it to be more freely wound and unwound upon and from the spool by reason of its freedom from corrosive deposits and moisture.

One of the specific objects is to mold the frame and spool as separate units, each of a homogeneous nature so that the entire device may be considered as being formed of two major parts mounted in such manner as to carry the other features of the invention.

Another specific object is to enable the manually-operated pawl of the clicking device to be retained in either position of adjustment and yieldingly held in its clicking position by a single spring.

A further object is to provide a simple and efficient brake device which is easily accessible and readily adjustable at will to produce more or less friction upon the reel without liability of changing its position by the rotation of the spool when once adjusted.

Other objects and uses relating to specific parts of the device will be brought out in the following description.

In the drawings:

Figure 1 is a perspective view of a fish rod reel embodying the various features of my invention shown as operatively mounted upon a fish rod, a portion of which is indicated by dotted lines.

Figures 2 and 3 are enlarged sectional views taken respectively on lines 2—2, and 3—3, Figure 1.

Figures 4 and 5 are further enlarged sectional views taken respectively in the planes of lines 4—4 and 5—5, Figure 2.

Figure 6:
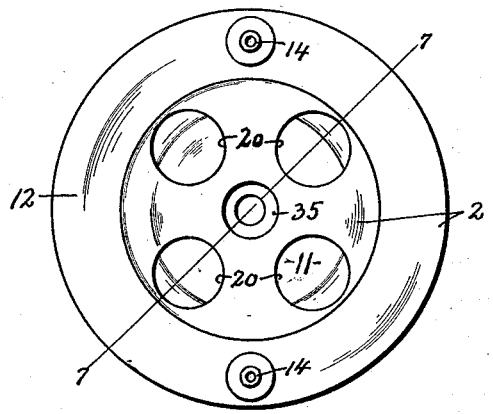
Figure 6 is a front end face view of the detached spool.
Figure 7:
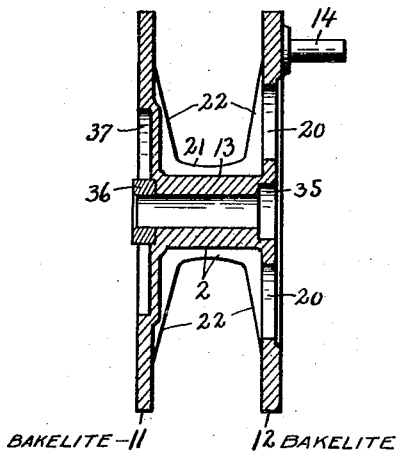
Figure 7 is a sectional view of the same reel taken on line 7—7, Figure 6.

As illustrated, this device comprises a substantially circular frame or housing —1— and a spool —2— rotatably mounted therein, said frame and spool being preferably molded from plastic material such as bakelite to form separate homogeneous units.

The frame —1— comprises a circular base —3— having an integral anular flange —4— projecting axially from its marginal edge concentric with its axis and of sufficient depth to receive and inclose the major portion of the spool —2—.

The base —3— is preferably solid but the annular flange —4— is provided with radial ventilating openings —5— in circumferentially spaced relation and preferably above the normal axis thereof to allow circulation of air therethrough to and from the interior of the housing for drying the line, said openings being wholly within the opposite ends of the flange —4— so that the ends of the flange may be continuous circumferentially across the openings.

The annular flange —4— of the housing —1— is provided with a clamping plate or foot —6— preferably of non-corrodible metal applied to the periphery thereof and extending tangentially thereto to receive suitable attaching ferrules —a— on the fish rod —A— for attaching the housing to the rod, said clamping plate being concavo-convex in cross section with its concave side applied to the periphery of the rod.

This clamping plate is provided with headed studs —7— which are incorporated in the adjacent side of the flange —4— while the housing is in a plastic state and during the hardening thereof by heat and pressure in the manner well-known in the manufacture of bakelite articles so that the clamping plate may become practically a unitary part of the housing as shown more clearly in Figures 2 and 3.

The housing —1— is cylindrical and cup-shaped and its walls are relatively thin as compared with the axial depth and diameter thereof which, and together with the ventilating openings —5— and the material from which the housing is formed, produce an extremely light, strong and durable structure having an internal cylinder chamber for receiving the reel —2—.

The housing —1— is provided with a central co-axial post —8— preferably of solid metal having one end enlarged at —9— and incorporated in the base —3— while the housing is in a more or less plastic state so that when the plastic material is hardened by heat and pressure the enlarged end —9— of the post will be firmly held in operative position upon the base —3— to form a substantially unitary part thereof.

The remaining portions of the post extend axially through the interior of the housing and a short distance beyond the open end thereof for receiving and supporting the reel —2— and also serving to receive a part of the click mechanism and a suitable brake device hereinafter more fully described.

The spool —2— is circular and of slightly less diameter than the interior diameter of the flange —4— to freely rotate relatively thereto and is centrally journaled upon the post —8— to extend axially approximately the full length of the flange —4—, said spool being provided with an annular recess —10— extending inwardly from its periphery a distance somewhat less than the radius of the spool to form opposite annular flanges —11— and —12— and an intervening hub —13— connecting the flanges co-axial therewith.

The front flange —12— is provided near its periphery with diametrically opposite axially extending posts —14— preferably of metal having their ends enlarged at —15— and incorporated in the adjacent portions of the flange —12— while the spool is in a plastic condition and during its hardening process by heat and pressure.

Suitable handles —16—, preferably of the same material as the housing —1— and spool —2—, are journaled upon the outer ends of the posts to facilitate the rotation of the reel by hand and are held in operative position against axial displacement by screws —17— which are engaged in threaded sockets in the outer ends of the posts —14—, and are provided with heads for engaging the outer ends of the handles to hold the latter against outward axial displacement.

The outer end of the spool-supporting post —8— is threaded externally and internally for receiving an internally threaded nut —18— and a screw —19—, the nut —18— serving to hold the spool —2— against outward axial displacement from the post —8—, and also as a support for a suitable brake member presently described, while the screw —19— serves to hold the nut —18— against outward axial displacement from the post.

The base flange —11— of the spool is preferably solid but relatively thin throughout the major portion of its circumferential length while the opposite flange —12— is provided with a plurality of, in this instance four, ventilating openings —20— arranged in uniformly spaced relation circumferentially about the axis of the spool, and extending from the periphery of the hub —13— some distance beyond the line-supporting flanges on said hub to allow the air to circulate in and around the line when wound upon the spool for the purpose of expeditiously drying the line.

That is, the hub of the spool is provided with a plurality of, in this instance four, outwardly projecting radial flanges —21— arranged in uniformly spaced relation circumferentially midway between the openings —20— for receiving and supporting the inner layer of the line when wound upon the spool, said flanges or ribs being extended outwardly a sufficient distance beyond the inner walls of the openings —20— to allow the air to circulate across and through the line coil on the spool.

For a similar purpose the inner faces of the flanges —11— and —12— are provided with a plurality of, in this instance four, radially extending ribs —22— projecting outwardly from the opposite ends of the ribs —21— on the hub so that the ribs of both flanges —11— and —12— will be in transverse alinement or in opposed relation in the same radial planes as the corresponding ribs —21—.

The inner edges of opposite ribs —22— are tapered inwardly from the peripheries of their respective flanges —11— and —12— and beyond the inner faces of the remaining portions of said flanges so as to form intervening air spaces at the ends of the line coil when wound upon the spool, said air spaces communicating with the air spaces between the ribs —21— to allow free circulation of air entirely around the line coil on the spool for drying purposes.

If desired one of the ribs —21— on the hub may be provided with a relatively small opening —23— near the rear flange —11— for receiving one end of the line and permitting its attachment to the spool by knotting the end of the line and thereby to prevent detachment of the line from the spool particularly when the line is unwound therefrom.

The nut —18— preferably comprises a metallic inner section —24— which is threaded internally for engaging the outer threaded end of the post —8—, and a hand wheel section —25— of substantially the same material as the housing —3— and spool —2— so that when molding the hand wheel —25— in a plastic state the metallic section —24— may be incorporated therein to form a substantial unitary part thereof after the plastic section has been hardened by heat and pressure.

The outer end of the nut —18— is provided with a central circular recess —26— for receiving the head of the screw —19— which, as previously stated, serves to prevent undue outward displacement of the nut from the post.

The threaded portion of the screw —19— is engaged in a threaded socket —27— in the adjacent end of the post —8— and is provided with an inwardly projecting reduced extension —28— forming a pilot to facilitate the entrance of the screw into said socket.

Brake device

The inner end of the metallic section —24— of the nut —18— is provided with a circular socket or recess —29— coaxial therewith for receiving a circular brake ring —30— which surrounds the adjacent portion of the post —8— and is provided with a key —31— movable in a key-way —32— in the adjacent portion of the post to hold the brake member —30— against rotation while permitting the free rotation of the nut —18—.

The inner end of the metallic portion —24— of the nut —18— is provided with an inwardly projecting annular flange —33— engaging in an annular groove —34— in the periphery of the brake member —30— to hold said brake member and nut against relative axial movement, and at the same time permitting said nut to be rotated upon the threaded end of the post —8— for moving the brake member —33— into and out of frictional engagement with the adjacent portion of the hub of the spool.

The outer end of the hub of the spool —2— is provided with an annular recess —35— for receiving the inner end of the nut —18— and brake member —30— and permitting said brake member to be moved into and out of frictional engagement with the inner end wall of said recess, the object of the recess being to bring the nut and brake member into more compact relation to the spool.

Click mechanism

Suitable means is provided for producing an audible clicking sound as may be desired by the rotation of the spool, as for example, when the line is playing out from the spool by a fish.

For this purpose the inner end of the spool is provided with a co-axial toothed wheel —36— preferably of metal incorporated in the adjacent portion of the spool while the latter is in a plastic condition to form a unitary part thereof when the spool is hardened by heat and pressure.

In order that portions of the toothed wheel —36— may be brought into engagement with the clicking pawl, presently described, the inner end of the spool is provided with an annular chamber or recess —37— into which the major portion of the toothed wheel —36— projects when secured in operative position upon the spool.

A split ring —38— preferably of spring wire surrounds the toothed wheel —36— substantially concentric therewith and in spaced relation thereto and is secured intermediate its ends to the base —3— of the housing by a clamping plate —39— and screw —40—, and has its opposite ends tensioned toward each other and engaged with the opposite edges of a clicking pawl —41— which is pivotally secured to an operating member —42— on the base —3— of the housing to rock laterally between limiting stop —51— against the action of the spring —38—, as shown more clearly in Figures 2 and 5.

That is, the base —3— of the housing —1— is provided with a radial slot —43— at one side of the post —8— in which the operating member —42— for the pawl —41— is movable.

The operating member —42— comprises a finger piece —44— of substantially the same material as the housing —1— and reel —2— in which is incorporated the outer end of a stud —45— having its inner end extended through the slot or opening —43— for receiving and pivotally supporting the pawl —41— which is held in operative position on the inner end of the stud —45— by means of a screw —46— engaged in a threaded socket in the inner end of the stud, as shown more clearly in Figure 2.

The button —44— of the pawl-operating member —42— is in sliding engagement with the outer face of the base —3— of the housing —1— while the pawl —41— is in sliding engagement with the inner face of said base thereby holding the pawl —41— and its operating member —42— in operative position, the radial length of the slot —43— being sufficient to allow the inner end of the pawl —41— to be moved to different positions between the meeting ends of the spring —38—.

The inner end of the pawl —41— is somewhat diamond shape and is provided with tapered inner edges —47— and outwardly tapered edges —48—.

When the pawl is adjusted to the limit of its movement away from the toothed wheel —36— or to the position shown by full lines in Figure 5, the tapered inner end thereof will be withdrawn from engagement with the teeth of the wheel —36— but will still remain between the meeting ends of the spring —38—.

On the other hand, when the pawl is adjusted inwardly or toward the axis of the wheel —36— by the operation of the button —44—, the inner tapered end of the pawl will be brought into the path of movement of the wheel —36—, and the beveled edges —48— will then be engaged with the meeting ends of the spring —38—, thereby yieldingly holding the pawl in its clicking position.

That is, when the pawl is adjusted to its clicking position and the reel is rotated, the teeth of the wheel —36— will successively engage the inner tapered end of the pawl 41 to rock the same laterally against the action of the spring —38— irrespective of the direction of the rotation of the spool thereby producing the desired clicking sound.

It is also evident that when the pawl is adjusted to its extreme outer position the ends of the springs —38— engaging the beveled edges —47— will serve to yieldingly hold the pawl in its non-clicking position.

It will be noted upon reference to Figure 5 that the pawl —41— and clamping plate —39— for the spring —38— are located at diametrically opposite sides of the axis of the post —8—, and that inasmuch as the clamping plate —39— is relatively narrow the opposite arms of the spring —38— are free to yield throughout the major portion of the circumference of the spring.

The clamping plate —39— is mounted upon a stud —49— which is incorporated in the base —3— of the frame —1— while the latter is in a plastic state to form a unitary part thereof when the frame is hardened by heat and pressure.

The screw —40— is engaged in a threaded socket in the inner end of the stud —49— to hold the plate in operative position.

The outer end of the plate —39— is bifurcated to receive a boss —50— on the adjacent portion of the base —3— of the frame —1— to additionally hold the clamping plate —39— against turning movement about the axis of the screw —40—.

Operation

It will be seen from the foregoing description that the housing —1—, together with the post —8— and stud —49— and also the foot plate —6— are molded together as one unit while the spool —2— and click wheel —36—, together with the handle posts or studs —14—, are molded together as a separate unit.

The spring —38— is then clamped in place upon the inner face of the base —3— of the housing, the finger piece —44— with the stud —42— thereon being inserted from the back through the slot —43— and the click pawl —41— is then secured by the screw —46— to the inner end of the stud —42— with its tapered faces —47— engaging the adjacent ends of the spring —38— as shown in Figure 5.

After the handles —16— are secured in operative position upon the studs —14— of the spool —2— the latter is inserted endwise within the marginal flange —4— of the housing and upon the post —8— and is held in operative position by the nut —18— engaging the outer threaded end of the post as shown in Figure 4.

When the nut —18— is placed upon the post —8— the key —31— of the brake member —30— is engaged in the key-way —32— of the post —8— to hold the brake member —30— against rotation while permitting its endwise movement into and out of engagement with the bottom of the recess —35— of the reel —2— as the nut —18— is turned upon the threaded end of the post —8—, it being understood that the head of the screw —19— limits the outward movement of the nut and that said nut is free to rotate upon and relatively to the brake member —30— which, together with the nut, are held against relative endwise movement by the flange —33— engaging in the annular groove —34— of the brake member —30— as shown in Figure 4.

When it is desired to produce an audible click by the rotation of the reel, the finger piece —44— carrying the click pawl —41— is moved inwardly toward the post —8— to bring the inner end of the pawl into the path of movement of the teeth of the click wheel —36— as shown by dotted lines in Figure 5 and at the same time bringing the beveled edges —48— into engagement with the meeting ends of the spring —38— which, by its own tension, serves to yieldingly hold the pawl in its clicking position.

On the other hand, when the click pawl —41— is moved outwardly away from the post —8— or to the position shown in full lines in Figure 5 the ends of the spring —38— will engage the beveled surfaces —47— to yieldingly hold the pawl in its inactive position.

When it is desired to retard the rotation of the spool the nut —18— may be screwed inwardly until the brake member —30— engages the inner end wall of the recess —35— of the spool, the degree of pressure of the brake member —30— against said end wall being regulated by the turning of the nut —18—.

When the spool is assembled in the housing in the manner described the foot plate —6— of the housing may be attached to the fish rod —A— ready for use.

One end of the fish line may be passed through the aperture —23— in the spool and knotted to hold it against endwise displacement after which the line may be wound upon the spool by the rotation of said spool.

When winding the line upon the spool it will be noted that the inner layer rests upon the saddle ribs —21— which are relatively narrow circumferentially leaving a greater open space between the line and hub of the spool for the circulation of air therethrough.

In like manner the opposite side layers of the line will be engaged with the inner faces of the ribs —22— which are also relatively narrow circumferentially thereby forming a greater open space between the side layers of the line and flanges —11— and —12— of the spool for the free circulation of air therethrough, it being understood that the spaces between the flanges —22— communicate with the spaces between the saddle ribs —21— and that the openings —5— and —20— in the housing —1— and spool —2— respectively permits free circulation of air to and from the interior chambers around the line coil.

What I claim is:—

1. In a fish-line reel, a one-piece cup-shaped housing, a post having one end permanently and rigidly incorporated in the end wall of the housing wholly within the outer face thereof to conceal the same and to hold the post against endwise displacement from said end wall and its other end threaded, a one-piece spool rotatably mounted on the intermediate portion of the post, a brake ring splined on the threaded end of the post for relative axial movement, and a nut engaging the threaded end of the post and operatively connected to the brake ring for moving the latter axially into and out of engagement with the spool as the nut is rotated in reverse directions.

2. A fish-line reel as in claim 1 in which the brake ring and nut are provided respectively with an annular groove and an annular rib rotatively engaging in the groove for holding the ring and nut against relative axial movement while permitting free rotation of the nut relatively to the ring.

3. In a fish-line reel, a housing, a post having one end secured to the housing and its other end threaded externally and internally, a spool rotatably mounted on the intermediate portion of the post, a brake ring splined on the threaded end of the post for relative axial movement thereon into and out of engagement with the adjacent end of the spool and provided with an annular peripheral groove, and a hand nut in screw engagement with the threaded end of the post and provided with an annular rib engaging in the annular groove of the brake ring for moving said brake ring axially as the nut is rotated in reverse directions, and a screw stop engaging the internal thread of the post for limiting the outward movement of the nut.

In witness whereof I have hereunto set my hand this 6th day of January, 1928.

JOSEPH B. HOLDEN.